United States Patent
Miyawaki et al.

(10) Patent No.: US 11,256,419 B2
(45) Date of Patent: Feb. 22, 2022

(54) OPTIMAL OBJECT PLACEMENT DEVICE AND METHOD

(71) Applicant: Hitachi, Ltd., Tokyo (JP)

(72) Inventors: Takashi Miyawaki, Tokyo (JP); Yuta Nishihara, Tokyo (JP); Atsushi Sera, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/007,132

(22) Filed: Aug. 31, 2020

(65) Prior Publication Data

US 2021/0303163 A1 Sep. 30, 2021

(30) Foreign Application Priority Data

Mar. 25, 2020 (JP) .............................. JP2020-054249

(51) Int. Cl.
*G06F 3/06* (2006.01)

(52) U.S. Cl.
CPC ............ *G06F 3/0605* (2013.01); *G06F 3/065* (2013.01); *G06F 3/0622* (2013.01); *G06F 3/0652* (2013.01); *G06F 3/0667* (2013.01); *G06F 3/0683* (2013.01)

(58) Field of Classification Search
CPC .... G06F 3/0605; G06F 3/0611; G06F 3/0622; G06F 3/0643; G06F 3/0647; G06F 3/065; G06F 3/0652; G06F 3/0667; G06F 3/067; G06F 3/0683
USPC ................ 711/137, 148, 154, 165, 204, 213
See application file for complete search history.

(56) References Cited

U.S. PATENT DOCUMENTS

| | | | |
|---|---|---|---|
| 2014/0173229 A1* | 6/2014 | Reohr | G06F 3/067 711/162 |
| 2016/0350148 A1 | 12/2016 | Kitagawa et al. | |
| 2017/0208125 A1* | 7/2017 | Jai | G06F 21/62 |
| 2018/0004441 A1* | 1/2018 | Takamura | G06F 3/067 |
| 2019/0146716 A1* | 5/2019 | Yang | G06F 3/061 711/154 |

FOREIGN PATENT DOCUMENTS

JP 2016-224484 A 12/2016

OTHER PUBLICATIONS

Japanese Office Action received in corresponding Japanese Application No. 2020-054249 dated Oct. 26, 2021.

* cited by examiner

*Primary Examiner* — Gary J Portka
(74) *Attorney, Agent, or Firm* — Mattingly & Malur, PC

(57) ABSTRACT

The deterioration of the operational efficiency of an optimal object placement device caused by the degradation in the access speed to the objects is inhibited. An optimal object placement device optimizes, in an information processing system having a storage area in each of a plurality of sites and in which a user can access objects stored in the storage area of all of the sites from each of the sites, placement of each of the objects; and an optimal object placement method is executed by the optimal object placement device, wherein control is executed for detecting an access tendency of the user's access to the objects.

8 Claims, 11 Drawing Sheets

FIG. 3

ACCESS HISTORY TABLE 25

| USER ID | ACCESS DATE/TIME | OBJECT NAME | LOCATION | TIER | OPERATION |
|---|---|---|---|---|---|
| 20001 | 2020/4/1 12:00:00 | AAA | SITE A | Tier1 | REFERENCE |
| 20001 | 2020/4/1 13:00:00 | BBB | SITE A | Tier1 | REFERENCE |
| 20001 | 2020/4/1 14:00:00 | CCC | SITE A | Tier1 | REFERENCE |
| 20001 | 2020/4/1 15:00:00 | DDD | SITE A | Tier1 | REFERENCE |
| 20001 | 2020/4/1 16:00:00 | EEE | SITE A | Tier1 | REFERENCE |
| 20001 | 2020/4/1 17:00:00 | FFF | SITE A | Tier1 | REFERENCE |
| 20001 | 2020/4/8 12:00:00 | AAA | SITE C | Tier1 | REFERENCE |
| 20001 | 2020/4/8 13:00:00 | DDD | SITE C | Tier1 | REFERENCE |
| 20001 | 2020/4/8 14:00:00 | BBB | SITE C | Tier1 | REFERENCE |
| 20001 | 2020/4/8 15:00:00 | AAA | SITE C | Tier1 | UPDATE |
| 20001 | 2020/4/8 16:00:00 | DDD | SITE C | Tier1 | UPDATE |
| 20001 | 2020/4/8 17:00:00 | AAA | SITE C | Tier1 | REFERENCE |
| 20001 | 2020/4/8 18:00:00 | DDD | SITE C | Tier1 | REFERENCE |
| 20001 | 2020/4/8 19:00:00 | BBB | SITE C | Tier1 | UPDATE |
| 20001 | 2020/4/15 12:00:00 | CCC | SITE B | Tier1 | REFERENCE |
| 20001 | 2020/4/15 13:00:00 | DDD | SITE B | Tier1 | REFERENCE |
| 20001 | 2020/4/15 14:00:00 | AAA | SITE B | Tier1 | UPDATE |
| 20001 | 2020/4/15 15:00:00 | DDD | SITE B | Tier1 | UPDATE |
| 20001 | 2020/4/15 16:00:00 | CCC | SITE B | Tier1 | REFERENCE |
| ... | ... | ... | ... | ... | ... |
| 25A | 25B | 25C | 25D | 25E | 25F |

FIG. 4

METADATA MANAGEMENT TABLE 26

| OBJECT NAME | UUID | ACCESS COUNT | ORDE-RING | RELATED NUMBER | USER EVAL-UATION | SUBSE-QUENT TRAN-SFER DESTI-NATION TIER | LOCATION MANAGEMENT | | STORAGE | IP ADDRESS | NUMBER OF TIERS | STO-RAGE TIER |
|---|---|---|---|---|---|---|---|---|---|---|---|---|
| | | | | | | | REGULAR | IRRE-GULAR | | | | |
| AAA | Path A | 99 TIMES | DDD | Null | Null | Null | SITE A, SITE C | SITE B | SITE A | 192.168.1.2 | 3 | Tier2 |
| BBB | Path B | 50 TIMES | Null | Null | Null | Null | SITE A, SITE C | SITE B | SITE A | 192.168.1.2 | 3 | Tier2 |
| CCC | Path C | 10 TIMES | Null | Null | Null | Null | SITE A, SITE C | SITE B | SITE A | 192.168.1.3 | 3 | Tier3 |
| DDD | Path D | 100 TIMES | EEE | 101 | Null | Null | SITE A, SITE C | SITE B | SITE A | 192.168.1.2 | 3 | Tier2 |
| EEE | Path E | 200 TIMES | GGG | 102 | Null | Null | SITE A, SITE C | SITE B | SITE A | 192.168.1.1 | 3 | Tier1 |
| FFF | Path F | 50 TIMES | BBB | Null | Null | Null | SITE A, SITE C | SITE B | SITE A | 192.168.1.2 | 3 | Tier2 |
| GGG | Path G | 100 TIMES | AAA | 103 | Null | Null | SITE A, SITE C | SITE B | SITE A | 192.168.1.2 | 3 | Tier2 |
| HHH | Path H | 200 TIMES | FFF | 104 | Null | Null | SITE A, SITE C | SITE B | SITE A | 192.168.1.1 | 3 | Tier1 |
| ... | ... | ... | ... | ... | ... | ... | ... | ... | ... | ... | ... | ... |
| 26AA | 26AB | 26AC | 26AD | 26AE | 26BA | 26BB | 26CA | 26CB | 26DA | 26DB | 26DC | 26DD |

(26A, 26B, 26C, 26D column groups)

FIG. 5

TRANSFER METHOD MANAGEMENT TABLE 27

| TRANSFER TARGET RELATED NUMBER | OPTIMAL TRANSFER FLAG | TRANSFER DESTINATION STORAGE | TRANSFER DESTINATION TIER | SAFEKEEPING PERIOD | STORAGE DATE | TEMPORARY COPY OBJECT DELETION FLAG | DIFFERENCE SYNCHRONIZATION FLAG |
|---|---|---|---|---|---|---|---|
| 100 | True | SITE B | Tier1 | 10 DAYS | 2020/1/1 | False | Not synced |
| 101 | True | SITE B | Tier1 | 10 DAYS | 2020/1/1 | False | Synced |
| 102 | True | SITE B | Tier1 | 10 DAYS | 2020/1/1 | False | Synced |
| 103 | True | SITE B | Tier1 | 10 DAYS | 2020/1/1 | False | Synced |
| 27A | 27B | 27C | 27D | 27E | 27F | 27G | 27H |

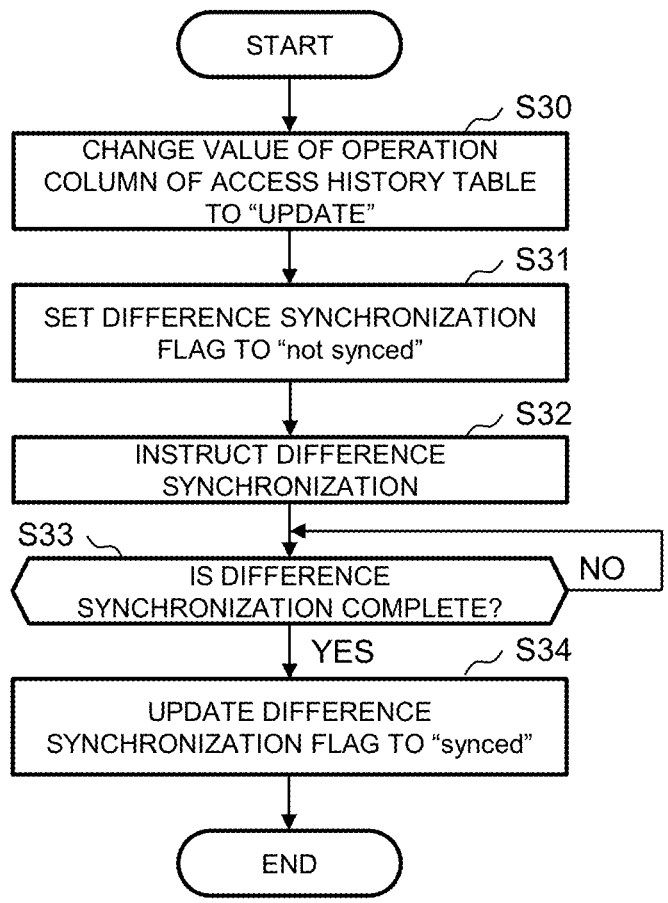

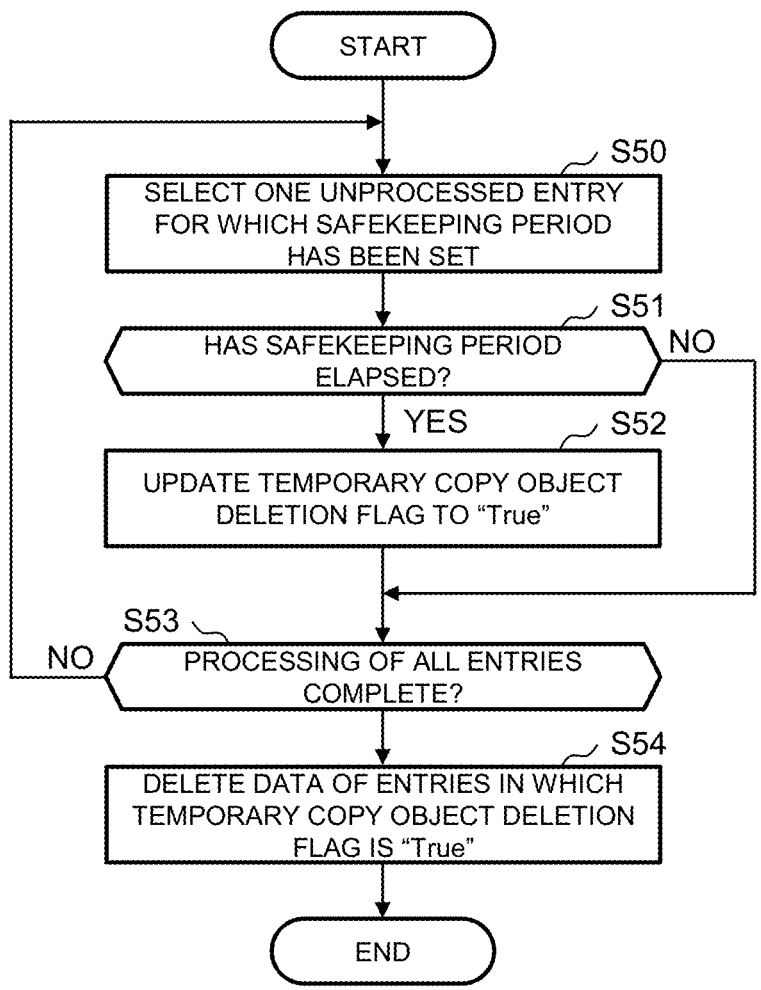

OPTIMAL OBJECT PLACEMENT DEVICE AND METHOD

CROSS-REFERENCE TO RELATED APPLICATION

The present application claims priority from Japanese application JP 2020-054249, filed on Mar. 25, 2020, the contents of which is hereby incorporated by reference into this application.

TECHNICAL FIELD

The present invention relates to an optimal object placement device and an optimal object placement method, and can be suitably applied to an optimal object placement device which optimizes the placement of objects as needed in an information processing system that is used in corporations and the like having a plurality of business sites.

BACKGROUND ART

In recent years, from the perspective of preventing the leakage of information, the number of corporations restricting their employees from carrying out data outside the office is increasing. Since an employee of such a corporation is unable to download required data on his/her laptop personal computer or USB (Universal Serial Bus) memory and can carry out such data even when going on a business trip to the corporation's business site other than the business site of one's own workplace, such employee needs to acquire the required data by accessing the server device or storage apparatus of the business site of one's own workplace from the business site of the business trip destination.

Furthermore, in recent years, a system referred to as a thin client which causes the client terminal to perform minimum processing and causes the server to perform most of the processing so as to inhibit employees from carrying out data outside the office is becoming popular, and various technologies related to the security of this kind of thin client system are being proposed (for example, PTL 1).

CITATION LIST

Patent Literature

[PTL 1] Japanese Unexamined Patent Application Publication No. 2016-224484

SUMMARY OF THE INVENTION

Problems to be Solved by the Invention

Meanwhile, with corporations and the like that have not yet introduced a thin client system, in cases of acquiring the required data by accessing the server device or storage apparatus of the business site of one's own workplace from the business site of the business trip destination, when the business site of the business trip destination is located at a remote location away from the business site of one's own workplace, there is a problem in that the access to the intended data will be slow, and the operational efficiency will deteriorate by that much.

The present invention was devised in view of the foregoing points, and an object of this invention is to propose an optimal object placement device and an optimal object placement method capable of effectively inhibiting the deterioration of the operational efficiency caused by the degradation in the accessibility to the object (data).

Means to Solve the Problems

In order to achieve the foregoing object, the present invention provides an optimal object placement device which optimizes, in an information processing system having a storage area in each of a plurality of sites and in which a user can access objects stored in the storage area of all of the sites from each of the sites, placement of each of the objects, comprising: an access tendency detection unit which detects an access tendency as a tendency of continuity of the user's access to the objects; and an object transfer control unit which executes, when the user accesses a first object from a second site which is different from a first site having the storage area storing the first object, control for transferring in advance, to the storage area of the second site from which the first object was accessed, the second object in which the user's tendency of consecutively accessing the first object is equal to or greater than a prescribed threshold.

The present invention additionally provides an optimal object placement method to be executed by an optimal object placement device which optimizes, in an information processing system having a storage area in each of a plurality of sites and in which a user can access objects stored in the storage area of all of the sites from each of the sites, placement of each of the objects, comprising: a first step of detecting an access tendency as a tendency of continuity of the user's access to the objects; and a second step of executing, when the user accesses a first object from a second site which is different from a first site having the storage area storing the first object, control for transferring in advance, to the storage area of the second site from which the first object was accessed, the second object in which the user's tendency of consecutively accessing the first object is equal to or greater than a prescribed threshold.

According to the optimal object placement device and method of the present invention, when a user is to access a second object subsequent to a first object, the user can promptly access the second object.

Advantageous Effects of the Invention

According to the present invention, it is possible to realize an optimal object placement device and method capable of inhibiting the deterioration of the operational efficiency caused by the degradation in the access speed to the objects.

BRIEF DESCRIPTION OF DRAWINGS

FIG. 3 is a diagram showing a configuration example of the access history table.

FIG. 4 is a diagram showing a configuration example of the metadata management table.

FIG. 5 is a diagram showing a configuration example of the transfer method management table.

FIG. 7 is a flowchart showing the processing routine of the difference synchronization control processing.

FIG. 10 is a flowchart showing the processing routine of the copy object deletion processing.

DESCRIPTION OF EMBODIMENTS

An embodiment of the present invention is now explained in detail with reference to the appended drawings.

Figure 1:
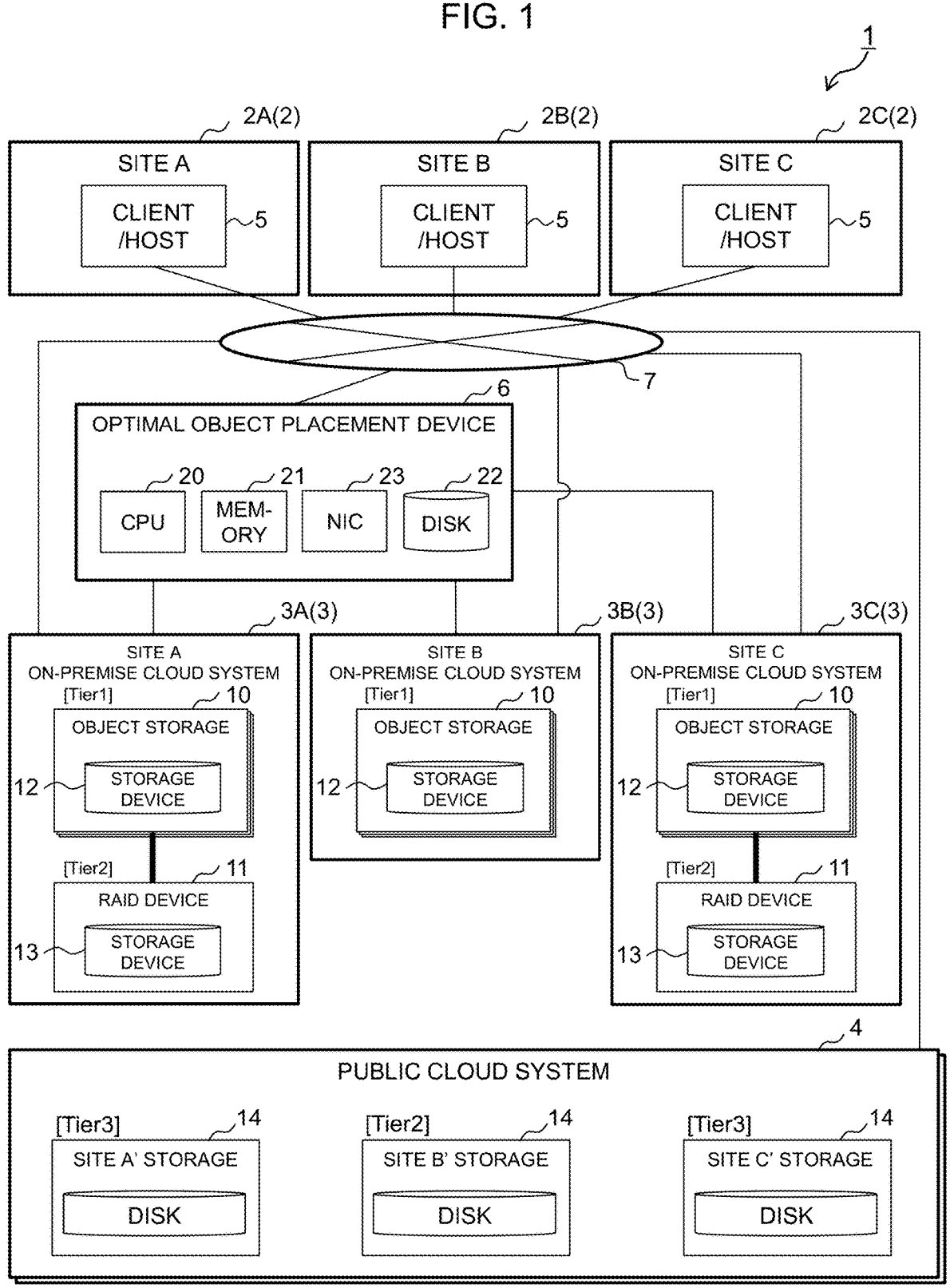
FIG. 1 is a block diagram showing the overall configuration of the information processing system according to this embodiment.

(1) Configuration of Information Processing System According to this Embodiment In FIG. 1, reference numeral 1 indicates the overall information processing system according to this embodiment. The information processing system 1 is configured by one or more on-premise cloud systems 3 (3A to 3C) respectively installed in a plurality of sites 2 (2A to 2C) owned by corporations or public offices, a public cloud system 4 owned by a public cloud service provider, a client/host 5 placed in each of the sites 2, and an optimal object placement device 6 installed in any of the sites 2 being mutually connected via a network 7.

The on-premise cloud system 3 is an on-premise-type cloud system installed in each of the sites 2, and is configured by comprising one or more object storage apparatuses 10, and a disk array device 11 which is installed as needed.

The object storage apparatus 10 is a large-capacity storage apparatus which handles data in object units. In the case of this embodiment, the object storage apparatus 10 is equipped with a storage device 12 such as aa SAS (Serial Attached SCSI (Small Computer System Interface)) or an SSD (Solid State Drive) and/or a flash memory, and provides a storage area of a storage tier referred to as "Tier 1" capable of reading and writing data at a high speed from and to the client/host 5.

The disk array device 11 is configured from a large-capacity RAID (Redundant Arrays of Independent Disks) device equipped with a plurality of hard disk devices, and is connected to each of the object storage apparatuses 10 via a fibre channel network or cable. In the case of this embodiment, the disk array device 11 is equipped with a storage device 13 such as a SATA (Serial Attached Technology Attachment), and provides a storage area of a storage tier referred to as "Tier 2" capable of reading and writing data, at a speed that is slower than "Tier 1", from and to the client/host 5 via the object storage apparatus 10.

The public cloud system 4 is configured by comprising a storage apparatus (this is hereinafter referred to as the "public cloud storage apparatus") 14 respectively installed in one or more sites of a public cloud service provider. Each public cloud storage apparatus 14 provides a storage area of a storage tier referred to as "Tier 2" capable of reading and writing data from and to the client/host 5, or "Tier 3" capable of reading and writing data, at a speed that is slower than "Tier 2", from and to the client/host 5.

The client/host 5 is a general-purpose computer device leased to an employee or a government worker (this is hereinafter referred to as the "user") working for a corporation or a public office that introduced the information processing system 1. The client/host 5 may be a fixed stationary type or a portable type. The user may use one's own client/host 5 to access the object storage apparatus 10 and the disk array device 11 of the site 2 of one's own workplace and another site 2, or the public cloud storage apparatus 14, via the network 7, and read and write required data from and to the object storage apparatus 10, the disk array device 11 and the public cloud storage apparatus 14.

The optimal object placement device 6 is a computer device equipped with an optimal object placement function described later, and is configured by comprising information processing resources such as a CPU (Central Processing Unit) 20, a memory 21, a storage device 22 and an NIC (Network Interface Card) 23.

The CPU 20 is a processor which governs the overall operational control of the optimal object placement device 6. Moreover, the memory 21 is configured from a non-volatile semiconductor memory, and is used as a work memory of the CPU 20. The memory 21 stores various programs loaded from the storage device 22.

The storage device 22 is configured, for example, from a large-capacity non-volatile storage device such as a hard disk device or an SSD, and stores various programs and data to be retained for a long period of time. As a result of the programs stored in the storage device 22 being loaded into the memory 21 when the optimal object placement device 6 is activated or as needed and the programs loaded into the memory 21 being executed by the CPU 20, various types of processing are executed as the overall optimal object placement device 6 as described later.

The NIC 23 is a device that is used by the optimal object placement device 6 to communicate with the client/host 5 of each site 2, the object storage apparatus 10 and the disk array device 11 of each site 2, and the public cloud storage apparatus 14 via the network 7. The NIC 23 performs protocol control when the optimal object placement device 6 communicates with these external devices.

(2) Optimal Object Placement Function

The optimal object placement function equipped in the optimal object placement device 6 is now explained. The optimal object placement function is, for example, when the user consecutively accesses a plurality of objects retained in the site 2 of one's workplace from a site 2 that is different from the site of one's workplace, a function of transferring (migrating or copying) each object accessed from the third time onward to the storage area of the foregoing different site 2 as needed. Note that the expression "storage area of the site 2" as used herein shall include, in addition to the storage area provided by the object storage apparatus 10 and the disk array device 11 installed in that site 2, the storage area provided by the public cloud storage apparatus 14 used as "Tier 2" or "Tier 3" in that site 2.

In effect, the optimal object placement device 6 detects and records, for each user, the tendency of continuity of the user's access to the objects, which is the tendency of the user consecutively accessing one object and another object, and, upon determining that the user tends to access a certain object and thereafter access another object, assigns a related number which is unique to a combination including the access order of these two objects (this is hereinafter referred to as the "object pair"). Note that, in the following explanation of the object pair, the object that is accessed first is hereinafter referred to as the "preceding object", and the object that is accessed subsequently is hereinafter referred to as the "succeeding object".

When the user consecutively accesses the preceding object and the succeeding object configuring the object pair to which the related number has been assigned from a site 2 that is different from the site 2 retaining such preceding object and succeeding object, the optimal object placement device 6 detects an object that is likely to be accessed consecutively after the succeeding object of that object pair, an object that is likely to be accessed consecutively after the foregoing object, and all other objects that may be accessed consecutively after the succeeding object (these objects are hereinafter collectively referred to as the "objects to be transferred").

In other words, the optimal object placement device 6 detects, as the objects to be transferred, all objects respectively configuring the respective object pairs to be accessed consecutively after the initial object pair, such as the succeeding object of a second object pair in which the succeeding object of a certain first object pair is the preceding object, the succeeding object of a third object pair in which the succeeding object of the second object pair is the preceding object, and so on.

Furthermore, the optimal object placement device 6 controls the object storage apparatus 10, the disk array device 11 or the public cloud storage apparatus 14 respectively retaining the objects to be transferred so that all of the detected objects to be transferred are migrated in advance to the storage area of the site 2, before being accessed by the user, from which the user accessed the preceding object and the succeeding object of the initial object pair (this kind of sequential control is hereinafter referred to as "prefetch control"). Based on this prefetch control, in cases where the user is likely to use a plurality of objects in order, it is possible to improve the accessibility to each of the objects to be transferred which may be sequentially and consecutively used as the third object onward.

Nevertheless, in cases where the optimal object placement device 6 records the history of which object was used by the user from which site 2 and the preceding object and the succeeding object of the initial object pair are accessed from a rare site 2, in the foregoing prefetch control, the optimal object placement device 6 controls the object storage apparatus 10, the disk array device 11 or the public cloud storage apparatus 14 respectively retaining the objects to be transferred so that each of the objects to be transferred is only copied, and not migrated, to the storage area of the rare site 2.

When the objects to be transferred, which were copied to the storage area of the rare site 2 as described above, are actually used and updated, the optimal object placement device 6 controls the object storage apparatus 10, the disk array device 11 or the public cloud storage apparatus 14 retaining the copy (this is hereinafter referred to as the "copy object") of the objects to be transferred so that the update is reflected in the original objects to be transferred based on a difference copy or the like (this control is hereinafter referred to as "difference synchronization control"). Based on this kind of prefetch control and difference synchronization control, the update of the copied objects to be transferred can be reliably reflected in the original objects to be transferred while avoiding a load being generated in the network 7 upon returning the objects to be transferred to the original site 2.

Furthermore, when the copy object of the objects to be transferred which were copied to the storage area of the rate site is not accessed for a given period of time, the optimal object placement device 6 controls the object storage apparatus 10, the disk array device 11 or the public cloud storage apparatus 14 retaining the copy object of the objects to be transferred so as to delete that copy object from the storage area (this control is hereinafter referred to as "copy object deletion control"). Based on this copy object deletion control, it is possible to inhibit the generation of unnecessary costs as a result of the copy object of the objects to be transferred remaining in the storage area of the rare site 2 indefinitely.

In addition, when the optimal object placement device 6 performs the prefetch control described above, the optimal object placement device 6 thereafter uses the user evaluation input screen 30, which is described later with reference to FIG. 9A, to acquire the user evaluation on whether the user felt the access to the objects to be transferred was "fast", "normal" or "slow". Based on the acquired user evaluation, the optimal object placement device 6 determines the storage tier of the transfer destination upon transferring (migrating or copying) the objects to be transferred to the storage area of any of the sites 2 at the time of the subsequent prefetch control.

Consequently, the object storage apparatus 10, the disk array device 11 or the public cloud storage apparatus 14 retaining the objects to be transferred is controlled so that such objects to be transferred are transferred to the storage area of the storage tier that was set in the site 2 of the transfer destination at the time of the subsequent prefetch control (this sequential control is hereinafter referred to as "transfer tier control"). Based on this transfer tier control, the objects to be transferred can be transferred to the proper storage tier according to the access speed required by the user.

Figure 2:
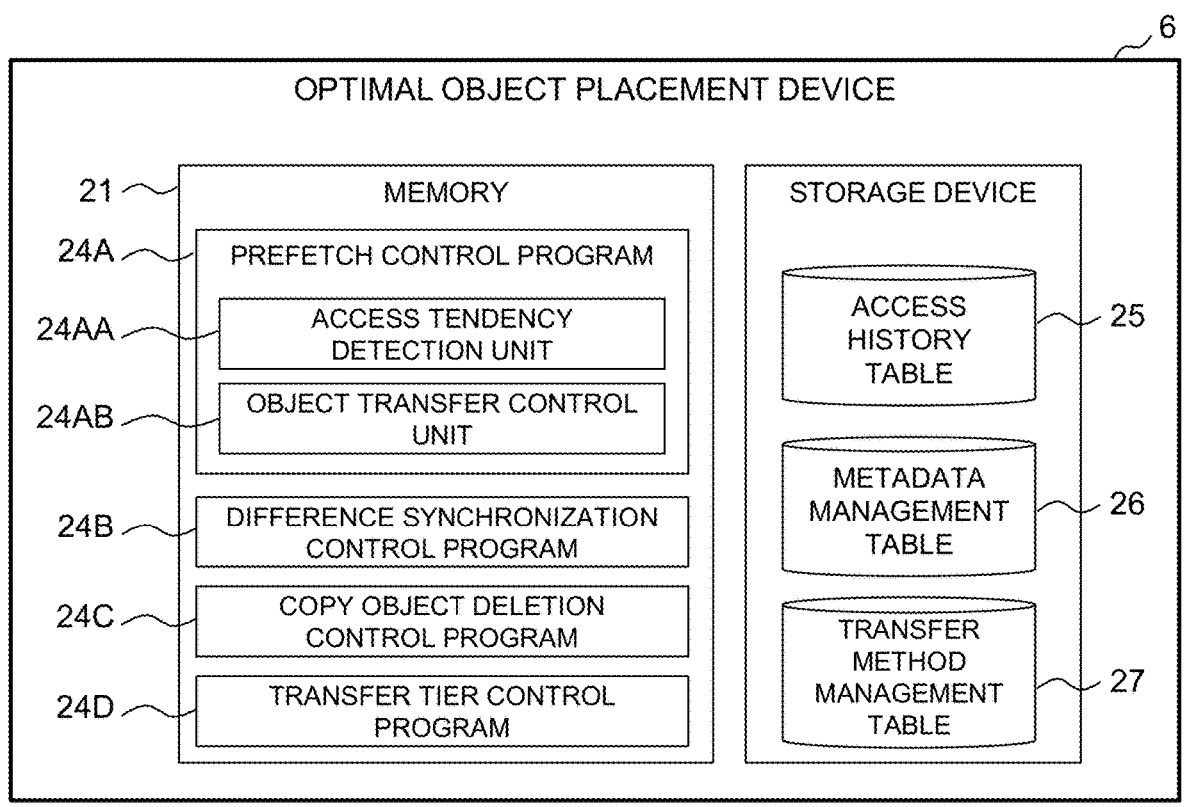
FIG. 2 is a block diagram explaining the programs and tables retained in the optimal object placement device.

As means for realizing the foregoing prefetch control, difference synchronization control, copy object deletion control and transfer tier control, as shown in FIG. 2, the memory 21 of the optimal object placement device 6 stores a prefetch control program 24A, a difference synchronization control program 24B, a copy object deletion control program 24C and a transfer tier control program 24D, and the storage device 22 stores an access history table 25, a metadata management table 26 and a transfer method management table 27.

The prefetch control program 24A is a program for causing the optimal object placement device 6 to execute sequential processing related to the foregoing prefetch control. The prefetch control program 24A is configured from an access tendency detection unit 24AA having a function of detecting the access tendency as the tendency of the user's order of accessing the objects, and an object transfer control unit 24AB having a function of executing control processing for transferring, as needed, the foregoing objects to be transferred to the storage area of the required site 2.

Moreover, the difference synchronization control program 24B is a program having a function for causing the optimal object placement device 6 to execute sequential processing related to the difference synchronization control described above, and the copy object deletion control program 24C is a program having a function for causing the optimal object placement device 6 to execute sequential processing related to the copy object deletion control described above. Furthermore, the transfer tier control program 24D is a program having a function for causing the optimal object placement device 6 to execute computation processing of determining the storage tier of the subsequent transfer destination of the objects to be transferred in relation to the transfer tier control described above.

Meanwhile, the access history table 25 is a table that is used for retaining and managing the information included in the access request reception notice which is sent from the object storage apparatus 10, the disk array device 11 or the public cloud storage apparatus 14. In the case of this embodiment, when the object that it retains is accessed by the user, the object storage apparatus 10, the disk array device 11 or the public cloud storage apparatus 14 sends, to the optimal object placement device 6, an access request reception notice including the required information related to that access (this is hereinafter referred to as the "access information"). Furthermore, the optimal object placement device 6 registers, in the access history table 25, the access information included in the received access request reception notice of a given period (for example, most recent 30-day period), and retains and manages such access information.

The access history table 25 is configured by comprising, as shown in FIG. 3, a user ID column 25A, an access date/time column 25B, an object name column 25C, a location column 25D, a tier column 25E and an operation column 25F. In the access history table 25, one line corresponds to one access from the user to one object.

Furthermore, the user ID column 25A stores an identifier (user ID) which was assigned to the user that made the corresponding access and which is unique to that user. Moreover, the access date/time column 25B stores the date/time that the access was made, and the object name column 25C stores the name of the object (object name) that was accessed.

Furthermore, the location column 25D stores the identifier of the site 2 (site ID) having the storage area storing the object that was accessed, and the tier column 25E stores the storage tier storing the object in that site 2.

Furthermore, the operation column 25F stores the operation that was performed by the corresponding user to the corresponding object. In the case of this embodiment, the operation column 25F stores the information of "reference" when the user merely referred to the corresponding object, and stores the information of "update" when the user also updated the corresponding object.

Accordingly, FIG. 3 shows a case where, for example, a user to which a user ID of "20001" was assigned made "reference" to the object named "AAA" stored in the storage area of the storage tier named "Tier 1" in "site A" on "2020/4/1" at "12:00:00", and thereafter made "reference" to the object named "BBB" stored in the storage area of the storage tier also named "Tier 1" in the on-premise cloud system 3 on "2020/4/1" at "13:00:00".

The metadata management table 26 is created for each user, and is a table that is used for storing and managing the objects previously accessed by the corresponding user and the required information related to the object pair configured by those objects. The metadata management table 26 is configured by comprising, as shown in FIG. 4, a metadata management area 26A, a user evaluation management area 26B, a location management area 26C and a storage configuration management area 26D. In the metadata management table 26, one line corresponds to one object pair.

The metadata management area 26A is an area for storing and managing the metadata related to the corresponding object pair, and is configured by comprising an object name column 26AA, a UUID column 26AB, an access count column 26AC, an ordering column 26AD and a related number column 26AE.

Furthermore, the object name column 26AA stores the object name of the preceding object of the corresponding object pair, and the UUID column 26AB stores the UUID (Universally Unique Identifier) which was assigned to the storage area storing the preceding object and which is unique to the storage area.

Moreover, the ordering column 26AD stores the object name of the succeeding object of the corresponding object pair, and the access count column 26AC stores the number of times that the preceding object and the succeeding object of the corresponding object pair were previously accessed successively in that order.

Furthermore, the related number column 26AE stores a unique number assigned to the corresponding object pair (this is hereinafter referred to as the "related number") when the access count becomes equal to or greater than a pre-set threshold (this is hereinafter referred to as the "access count threshold"). At the stage that the related number is assigned to the object pair, the succeeding object of that object pair becomes the object to be transferred described above.

The user evaluation management area 26B is an area for storing and managing the information required for the transfer tier control described above, and is configured by comprising a user evaluation column 26BA and a subsequent transfer destination tier column 26BB.

Furthermore, the user evaluation column 26BA stores the user evaluation acquired using the user evaluation input screen 30 described later with reference to FIG. 9A on whether the user felt the access to the succeeding object of the corresponding object pair was "fast", "normal" or "slow" as a result of the foregoing prefetch control. Moreover, the subsequent transfer destination tier column 26BB stores the storage tier of the transfer destination (this is hereinafter referred to as the "subsequent transfer destination tier") to be used at the time of the subsequent prefetch control of the succeeding object which was determined based on the user evaluation.

Note that the user evaluation column 26BA and the subsequent transfer destination tier column 26BB do not store data in their initial state ("Null"), and store the user evaluation or the subsequent transfer destination tier at the stage that the user evaluation is acquired or at the stage that the subsequent transfer destination tier is determined.

The location management area 26C is an area for storing and managing the information required for the prefetch control and the copy object deletion control described above, and is configured by comprising a regular column 26CA and an irregular column 26CB. Furthermore, the regular column 26CA stores the identifier (site ID) of all sites (each of these sites is hereinafter referred to as the "regular site" as needed) in which the number of times that the preceding object of the corresponding object pair was accessed is relatively great. Moreover, the irregular column 26CB stores the site ID of all sites (each of these sites is hereinafter referred to as the "irregular site") in which the number of times that the preceding object was accessed is relatively small (sites which are rarely accessed).

The storage configuration management area 26D is an area for managing the storage configuration and other information of the site 2 storing the succeeding object configuring the corresponding object pair, and is configured by comprising a storage column 26DA, an IP address column 26DB, a number of tiers column 26DC and a storage tier column 26DD.

Furthermore, the storage column 26DA stores the site ID of the site 2 retaining the succeeding object of the corresponding object pair, and the IP address column 26DB stores the IP (Internet Protocol) address of the object storage apparatus 10, the disk array device 11 or the public cloud storage apparatus 14 which is providing the storage area storing the succeeding object in the site 2.

Moreover, the number of tiers column 26DC stores the number of storage tiers set in the site 2, and the storage tier column 26DD stores, among these storage tiers, the storage tier storing the succeeding object of the corresponding object pair.

Accordingly, FIG. 4 shows a case where, for example, the object (preceding object) named "AAA" is stored in the storage area of the UUID named "Path A", and, while the object (succeeding object) named "DDD" is often accessed consecutive to the foregoing object, since the number of times that these objects have been consecutively accessed previously is "99 times", a related number has not yet been assigned ("Null") to the object pair that is configured from these objects.

Moreover, in the case of FIG. 4, since a related number has not been assigned to the foregoing object pair, the prefetch control of causing the succeeding object of the object pair to be an object to be transferred has not yet been performed, and therefore the user evaluation of the prefetch control has not yet been acquired ("Null"). Moreover, FIG. 4 shows that the storage tier of the transfer destination of the succeeding object to be used at the time of the subsequent prefetch control has not yet been determined ("Null").

Furthermore, FIG. 4 shows a case where the regular site of the preceding object of the object pair is "site A" and "site C" and the irregular site is "site B", the preceding object is normally stored in the storage tier named "Tier 2" of the site named "site A" having "3" storage tiers, and is stored in the storage apparatus (object storage apparatus 10, disk array device 11 or public cloud storage apparatus 14) having an IP address of "192.168.1.2".

Note that the information related to the object pair is registered in the metadata management table 26 in the following manner. Foremost, when the user accesses a new object, an unused line of the metadata management table 26 is secured, and the object name of that object is stored in the object name column 26AA of that line as the object name of the preceding object.

Moreover, required information is additionally stored in the UUID column 26AB, the storage column 26DA, the IP address column 26DB, the number of tiers column 26DC and the storage tier column 26DD of that line. The "required information" in the foregoing case is acquired as needed by the access tendency detection unit 24AA (FIG. 2) of the prefetch control program 24A (FIG. 2) from the storage apparatus (object storage apparatus 10, disk array device 11 or public cloud storage apparatus 14) retaining such preceding object and succeeding object.

When the user thereafter accesses another object consecutively after the preceding object, the object name of such "another object" is stored in the ordering column 26AD of the foregoing line as the object name of the succeeding object, and the information of "once" is stored in the access count column 26AC of that line. Here, if that user accesses an object other than the succeeding object consecutively after the preceding object, another unused line is secured, and required information is stored in that line.

Furthermore, the access count stored in the access count column 26AC is incremented (increased by one) each time the succeeding object is accessed consecutively after the preceding object, and, when the access count becomes equal to or greater than the foregoing access count threshold, a related number is assigned to the object pair configured from the preceding object and the succeeding object, and the related number is stored in the related number column 26AE.

Meanwhile, the user evaluation is registered in the user evaluation column 26BA at the stage that the transfer tier control program 24D acquires the user evaluation as described later, and the storage tier as the subsequent transfer destination is registered in the subsequent transfer destination tier column 26BB after the transfer tier control program 24D determines the storage tier of the subsequent transfer destination of the corresponding succeeding object based on the user evaluation.

Moreover, information is registered in the regular column 26CA and the irregular column 26CB in the following manner. Foremost, the access tendency detection unit 24AA of the prefetch control program 24A refers to the access history table 25 (FIG. 3), periodically aggregates, for each site 2, the number of times that the corresponding user accessed the corresponding preceding object, and calculates the ratio of the access count from each site 2 relative to the total number of times that the user accessed the preceding object.

Furthermore, the access tendency detection unit 24AA stores, in the irregular column 26CB, the site ID of each site 2, in which the calculated ratio is equal to or less than the pre-set threshold, as an irregular site, and stores, in the regular column 26CA, the site ID of each site 2, in which the calculated ratio is equal to or greater than the pre-set threshold, as a regular site. As the method of detecting the regular site and the irregular site, various other detection methods may be broadly applied.

The transfer method management table 27 is a table that is used for managing the information required for the prefetch control, the difference synchronization control, the copy object deletion control and the transfer tier control. The transfer method management table 27 is configured by comprising, as shown in FIG. 5, a transfer target related number column 27A, an optimal transfer flag column 27B, a transfer destination storage column 27C, a transfer destination tier column 27D, a safekeeping period column 27E, a storage date column 27F, a temporary copy object deletion flag column 27G and a difference synchronization flag column 27H. In the transfer method management table 27, one line corresponds to one object pair to which the succeeding object will be transferred, or has been transferred, based on the prefetch control.

Furthermore, the transfer target related number column 27A stores the related number of the corresponding object pair, and the optimal transfer flag column 27B stores a flag indicating the transfer method of whether the succeeding object (corresponds to the object to be transferred) of the corresponding object pair is to be transferred, or has been transferred, by way of migration or copy (this flag is hereinafter referred to as the "optimal transfer flag"). In the case of FIG. 5, the value of the optimal transfer flag is set to "True" when the succeeding object will be copied or has been copied, and the value of the optimal transfer flag is set to "False" when the succeeding will be migrated or has been migrated, respectively.

Furthermore, the transfer destination storage column 27C stores the site ID of the site 2 which will be the transfer destination, or which became the transfer destination, of the succeeding object of the corresponding object pair, and the transfer destination tier column 27D stores the storage tier which should store the succeeding object, or which has stored the succeeding object, in the site 2 of the transfer destination.

The safekeeping period column 27E stores, when the transfer method of the succeeding object of the corresponding object pair is "copy", the period that the copy of the succeeding object should be safekept (safekeeping period). Note that the safekeeping period may be a pre-set uniform period, or may be set by the user on a case-by-case basis. Moreover, the storage date column 27F stores, when the succeeding object is copied to the site of the transfer destination based on the prefetch control, the date of such storage.

The temporary copy object deletion flag column 27G stores a flag indicating whether the copy object of the succeeding object of the corresponding object pair has already been deleted (this flag is hereinafter referred to as the "temporary copy object deletion flag"). Note that, in the case of FIG. 5, the temporary copy object deletion flag is set to "True" when the copy object has already been deleted, and set to "False" when the copy object has not yet been deleted.

Furthermore, the difference synchronization flag column 27H stores, when the transfer method of the succeeding object of the corresponding object pair is "copy", a flag indicating whether the copy object of the succeeding object and the original succeeding object (succeeding object of the copy source) have undergone difference synchronization (this flag is hereinafter referred to as the "difference synchronization flag"). The difference synchronization flag stores "Synced" as the initial value, and this is changed to "Not synced" when the copy object of the succeeding object is updated. Moreover, the difference synchronization flag is thereafter returned to "Synced" when the update of the copy object of the succeeding object is reflected in the original succeeding object.

Accordingly, FIG. 5 shows a case where the succeeding object of the object pair to which the related number of "100" was assigned has been copied to the storage tier named "Tier 1" of "site B" on "2020/1/1" (value of the optimal transfer flag is "True"), and the safekeeping period thereof is "10 days". Moreover, FIG. 5 shows that, while the copy of the succeeding object has been updated (value of the difference synchronization flag is "Not synced"), the update has not yet been reflected in the original succeeding object (value of the temporary copy object deletion flag is "False").

(3) Various Types of Processing to be Executed in Relation to the Optimal Object Placement Function The specific processing contents of various types of processing to be executed by the optimal object placement device 6 in relation to the optimal object placement function described above are now explained. Note that, in the following explanation, while the processing subject of the various types of processing is explained as a "program", in effect, it goes without saying that the CPU 20 (FIG. 1) of the optimal object placement device 6 executes such processing based on the "program".

(3-1) Prefetch Control Processing

Figure 6A:
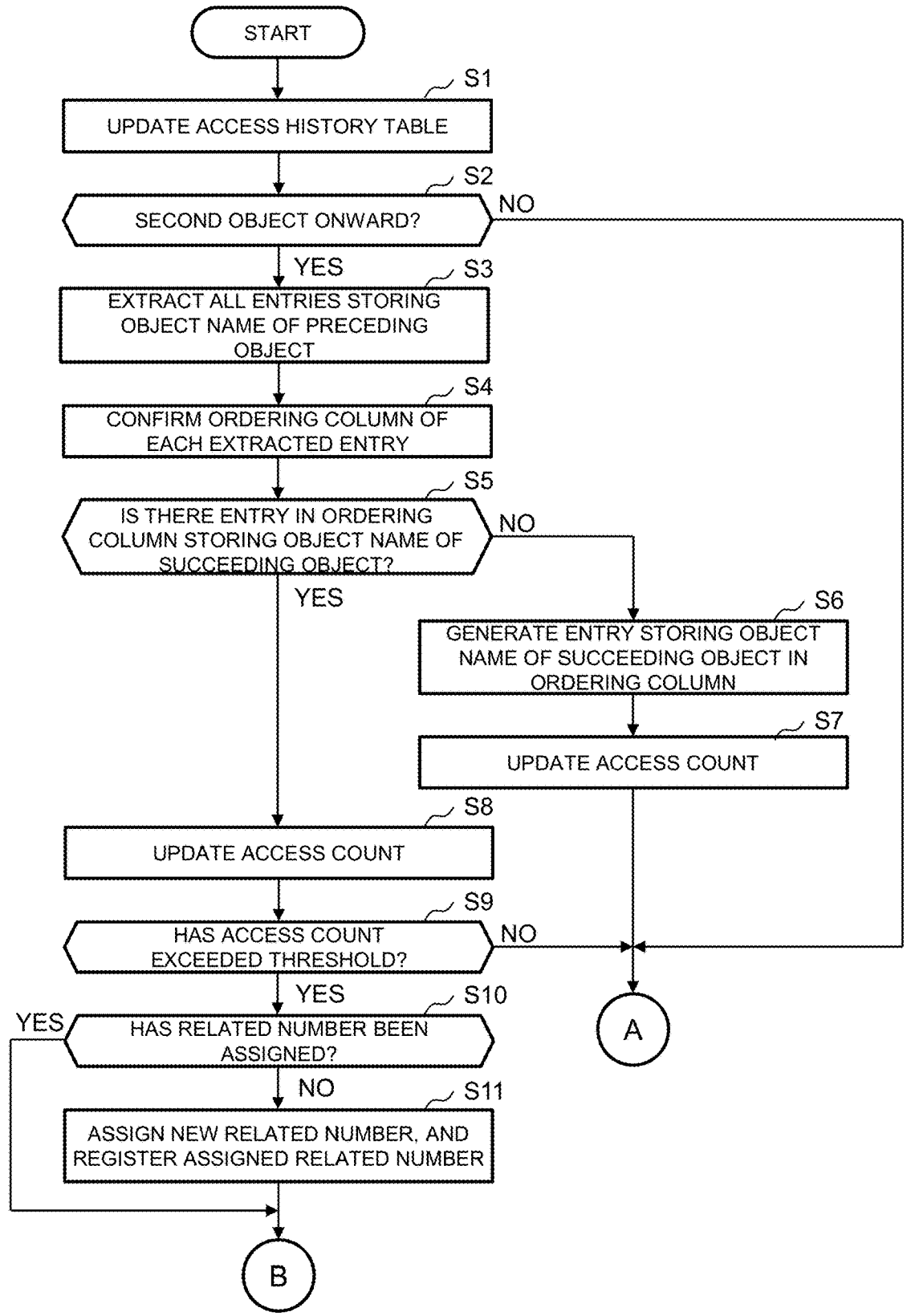
FIG. 6A is a flowchart showing the processing routine of the prefetch control processing.
Figure 6B:
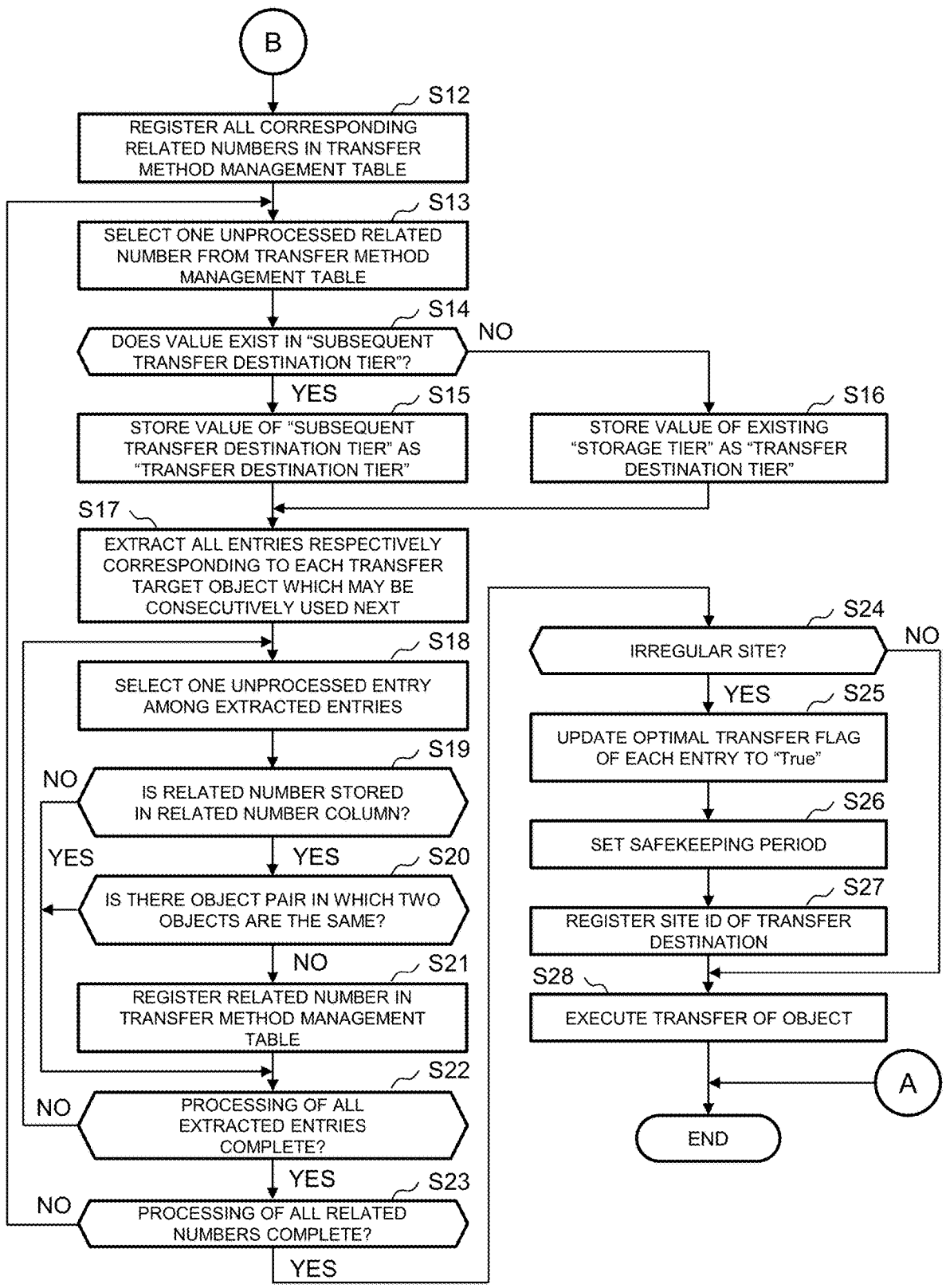
FIG. 6B is a flowchart showing the processing routine of the prefetch control processing.

FIG. 6A and FIG. 6B show the flow of the sequential processing to be executed by the access tendency detection unit 24AA and the object transfer processing unit 24AB of the prefetch control program 24A in relation to the prefetch control described above (this processing is hereinafter referred to as the "prefetch control processing").

The access tendency detection unit 24AA of the prefetch control program 24A starts the prefetch control processing shown in FIG. 6A and FIG. 6B upon receiving the foregoing access request reception notice from the object storage apparatus 10 (FIG. 1), the disk array device 11 or the public cloud storage apparatus 14 (FIG. 1) which is providing the storage area of any of the sites 2.

The access tendency detection unit 24AA foremost registers, in the access history table 25 (FIG. 3), required access information related to the access based on the access request reception notice (S1). Moreover, the access tendency detection unit 24AA refers to the access history table 25, and determines whether the access is an access by the same user to the second consecutive object (that is, a consecutive access to another object by the same user after that user accessed a certain object) (S2). When the access tendency detection unit 24AA obtains a negative result in the foregoing determination, the access tendency detection unit 24AA ends the prefetch control processing.

Meanwhile, when the access tendency detection unit 24AA obtains a positive result in the determination of step S2, the access tendency detection unit 24AA extracts all entries, among the respective entries (lines) of the metadata management table 26 (FIG. 4), in which the object name of the object that was accessed first (preceding object) among the accesses to the consecutive objects is stored in the object name column 26AA (FIG. 4) (S3).

Subsequently, the access tendency detection unit 24AA confirms the ordering column 26AD (FIG. 4) of each entry extracted in step S3 (S4), and determines, among the foregoing entries, whether there is an entry in which the object name of the object that was accessed at such time (succeeding object) is stored in the ordering column 26AD based on the foregoing confirmation result (S5).

To obtain a negative result in the foregoing determination means that the corresponding user consecutively accessed the two objects for the first time. Consequently, here, the access tendency detection unit 24AA generates, in metadata management table 26, the object name of the preceding object is stored in the object name column 26AA, the object name of the succeeding object is stored in the ordering column 26AD, and the new entry in which other storable information is stored in each of the corresponding columns (for example, UUID column 26AB, storage column 26DA, IP address column 26DB, number of tiers column 26DC and storage tier column 26DD) (S6).

Moreover, the access tendency detection unit 24AA stores the value of "once", which means that the preceding object and the succeeding object were consecutively accessed for the first time, in the access count column 26AC (FIG. 4) of the new entry (S7), and thereafter ends the prefetch control processing.

Meanwhile, to obtain a positive result in the determination of step S5 means that the corresponding user has previously consecutively accessed the preceding object and the succeeding object. Consequently, here, the access tendency detection unit 24AA foremost increments (increases by one) the access count stored in the access count column 26AC of the entry in which the positive result was obtained in step S5 (this is hereinafter referred to as the "corresponding entry") (S8).

Next, the access tendency detection unit 24AA determines whether the count stored in the access count column 26AC of the corresponding entry is equal to or greater than the foregoing access count threshold (S9). When the access tendency detection unit 24AA obtains a negative result in the foregoing determination, the access tendency detection unit 24AA ends the prefetch control processing.

Meanwhile, when the access tendency detection unit 24AA obtains a positive result in the determination of step S9, the access tendency detection unit 24AA determines whether a related number has already been assigned to the object pair configured from the preceding object in which the object name is stored in the object name column 26AA of the corresponding entry, and the succeeding object in which the object name is stored in the ordering column 26AD of the corresponding entry (S10). This determination is made based on whether a value is stored in the related number column 26AE (FIG. 4) of the corresponding entry.

When the access tendency detection unit 24AA obtains a positive result in the foregoing determination, the access tendency detection unit 24AA proceeds to step S12. Moreover, when the access tendency detection unit 24AA obtains a negative result in the determination of step S10, the access tendency detection unit 24AA assigns a new related number to the object pair which is unique to that object pair, and stores the assigned related number in the related number column 26AE of the corresponding entry (S11). The access tendency detection unit 24AA thereafter calls the object transfer control unit 24AB.

When the object transfer control unit 24AB is called by the access tendency detection unit 24AA, the object transfer control unit 24AB foremost extracts, among the entries of the metadata management table 26, all entries in which the object name of the succeeding object is stored in the object name column 26AA. Moreover, when a related number is stored in the related number column 26AE of these entries, the object transfer control unit 24AB reads all such related numbers, and respectively stores each of the read related numbers in the transfer target related number column 27A of a different unused line of the transfer method management table 27 (FIG. 5) (S12).

Thus, when there are a plurality of objects which were consecutively accessed after the succeeding object in the past and the access count thereof is equal to or greater than the access count threshold, each of these objects is set to be a succeeding object, and all related numbers assigned to each object pair in which the succeeding object of the object pair corresponding to the entry extracted in step S5 is the preceding object are respectively stored in the transfer target related number column 27A of a different line in the transfer method management table 27.

Next, the object transfer control unit 24AB selects one related number, in which the processing of step S14 onward has not yet been performed, among the related numbers stored in the transfer target related number column 27A of the transfer method management table 27 in step S12 (S13). Moreover, the object transfer control unit 24AB determines, among the entries of the metadata management table 26 (FIG. 4), whether a value is stored in the subsequent transfer destination tier column 26BB of an entry in which the related number selected in step S13 (this is hereinafter referred to as the "selected related number") is stored in the related number column 26AE (S14).

To obtain a positive result in the foregoing determination means that, with regard to the succeeding object of the object pair to which the selected related number has been assigned, as explained later with reference to FIG. 8, the storage tier of the transfer destination to be used at the time of the subsequent transfer has already been determined based on the foregoing transfer tier control, and the determined storage tier has been stored in the subsequent transfer destination tier column 26BB of the corresponding entry of the metadata management table 26.

Consequently, here, the object transfer control unit 24AB stores, in the transfer destination tier column 27D (FIG. 5) of the entry (entry in which the related number is stored in the transfer target related number column 27A (FIG. 5)) corresponding to the selected related number of the transfer method management table 27 (FIG. 5), the storage tier which is stored in the subsequent transfer destination tier column 26BB of the corresponding entry (entry in which the selected related number is stored in the related number column 26AE) of the metadata management table 26 (S15).

Meanwhile, to obtain a negative result in the determination of step S14 means that, with regard to the succeeding object of the object pair to which the selected related number has been assigned, the storage tier of the transfer destination to be used at the time of the subsequent transfer has not yet been determined, and is of a state in which a value has not been stored in the subsequent transfer destination tier column 26BB of the corresponding entry of the metadata management table 26 ("Null").

Consequently, here, the object transfer control unit 24AB stores, in the transfer destination tier column 27D of the entry corresponding to the selected related number of the transfer method management table 27, the existing storage tier which is stored in the storage tier column 26DD of the corresponding entry of the metadata management table 26 (S16). Note that, in substitute for the existing storage tier, the value of a specific pre-set storage tier (for example, "Tier 1") may also be stored in the transfer destination tier column 27D.

Subsequently, the object transfer control unit 24AB extracts, among the entries of the metadata management table 26, the entries respectively corresponding to all objects that may be additionally used consecutively after the succeeding object of the object pair to which the related number selected in step S13 (selected related number) has been assigned (S17).

Specifically, the object transfer control unit 24AB extracts, from the metadata management table 26, the object name stored in the ordering column 26AD of the entry in which the selected related number is stored in the related number column 26AE. Moreover, the object transfer control unit 24AB extracts, among the entries of the metadata management table 26, all entries in which the object name extracted as described above is stored in the object name column 26AA.

Next, the object transfer control unit 24AB selects one entry, among the entries extracted in step S17, in which the processing of step S19 onward has not yet been performed (S18), and determines whether a related number is stored in the related number column 26AE of the entry that was selected (this is hereinafter referred to as the "selected entry") (S19).

To obtain a negative result in the foregoing determination means that the object in which the object name is stored in the object name column 26AA of the selected entry and the object in which the object name is stored in the ordering column 26AD of the selected entry have not been consecutively accessed in a count that is equal to or greater than the access count threshold, and that the object in which the object name is stored in the ordering column 26AD is not a target of the prefetch control. Consequently, here, the object transfer control unit 26AB proceeds to step S22.

Meanwhile, to obtain a positive result in the determination of step S19 means that the object in which the object name is stored in the object name column 26AA of the selected entry and the object in which the object name is stored in the ordering column 26AD of the selected entry have already been accessed consecutively in a count that is equal to or greater than the access count threshold and, accordingly, the object in which the object name is stored in the ordering column 26AD is a target of the prefetch control.

Consequently, here, the object transfer control unit 24AB determines, among the object pairs to which the related number has been assigned and in which the processing of step S14 onward has been executed, whether there is an object pair configured from the object in which the object name is stored in the object name column 26AA of the selected entry and the object in which the object name is stored in the ordering column 26AD of the selected entry (S20).

For example, with the object in which the object name is stored in the object name column 26AA of the selected entry as "AAA", and the object in which the object name is stored in the ordering column 26AD of the selected entry as "DDD", the object transfer control unit 24AB determines whether there is an object pair in which the object which was accessed first is "DDD" and the object which was accessed subsequently is "AAA" among the object pairs to which the related number has been assigned and in which the processing of step S14 onward has been executed.

To obtain a positive result in the foregoing determination means that, since the object in which the object name is stored in the object name column 26AA of the selected entry (object named "DDD" in the foregoing example) is already a target of the prefetch control, there is no need to make it a target of the prefetch control once again. Consequently, here, the object transfer control unit proceeds to step S22.

Meanwhile, to obtain a negative result in the determination of step S20 means that the object in which the object name is stored in the object name column 26AA of the selected entry is not yet a target of the prefetch control. Consequently, here, the object transfer control unit 24AB registers the related number stored in the related number column 26AE of the selected entry in the transfer target related number column 27A of an unused line of the transfer method management table 27 (S21).

The object transfer control unit 24AB thereafter determines whether the processing of step S18 to step S21 has been completed for all entries extracted in step S17 (S22). The object transfer control unit 24AB returns to step S18 upon obtaining a negative result in the foregoing determination, and thereafter repeats the processing of step S18 to step S22 while sequentially switching the entry selected in step S18 to another corresponding entry in which the processing of step S19 onward has not yet been performed.

When the object transfer control unit 24AB eventually obtains a positive result in step S22 as a result of the processing of step S18 to step S21 having been completed for all entries extracted in step S17, the object transfer control unit 24AB determines whether the processing of step S14 to step S22 has been completed for all related numbers registered in the transfer method management table 27 (S23).

The object transfer control unit 24AB returns to step S13 upon obtaining a negative result in the foregoing determination, and thereafter repeats the processing of step S13 to step S23 while sequentially switching the related number selected in step S13 to another related number registered in the transfer method management table 27 and in which the processing of step S14 onward has not yet been performed.

The object transfer control unit 24AB thereafter refers to the metadata management table 26 upon obtaining a positive result in step S23 as a result of the processing of step S14 to step S22 having been completed for all related numbers registered in the transfer method management table 27, and determines whether the site 2 that accessed the object in which the access information was registered in the access history table 25 in step S1 is an irregular site of the object (S24). When the object transfer control unit 24AB obtains a negative result in the foregoing determination, the object transfer control unit 24AB proceeds to step S28.

Meanwhile, when the object transfer control unit 24AB obtains a positive result in the determination of step S24, the object transfer control unit 24AB updates the optimal transfer flag stored in the optimal transfer flag column 27B (FIG. 5) of each entry of the transfer method management table 27 from the initial value of "False" to "True" (S25). Moreover, the object transfer control unit 24AB stores the previously arranged safekeeping period in the safekeeping period column 27E (FIG. 5) of each entry (S26), and stores the site ID of the site 2 from which the user accessed the first and second objects in the transfer destination storage column 27C (FIG. 5) of each entry (S27).

Next, the object transfer control unit 24AB instructs, according to the existing transfer method management table 27, the object storage apparatus 10, the disk array device 11 or the public cloud storage apparatus 14 retaining the succeeding object to transfer such succeeding object of each object pair in which the related number is stored in the transfer target related number column 27A (FIG. 5) of the transfer method management table 27 to the storage area of the storage tier stored in the transfer destination tier column 27D of the corresponding entry of the site 2 in which the site ID is stored in the transfer destination storage column 27C of the entry in which the related number in the transfer method management table 27 is stored in the transfer target related number 27A (S28).

Here, with regard to the succeeding object corresponding to the entry in which "True" is stored in the optimal transfer flag column 27B of the transfer method management table 27, the object transfer control unit 24AB copies the succeeding object to the transfer destination, and, with regard to the succeeding object corresponding to the entry in which "False" is stored in the optimal transfer flag column 27B, instructs the object storage apparatus 10, the disk array device 11 or the public cloud storage apparatus 14 retaining the succeeding object to transfer such succeeding object to the transfer destination.

When the transfer of the succeeding object of each object pair in which the related number is registered in the transfer method management table 27 as described above is completed, the object transfer control unit 24AB ends the prefetch control processing.

(3-2) Difference Synchronization Control Processing

FIG. 7 shows the flow of the difference synchronization control processing to be executed by the difference synchronization control program 24B when the copy object of the objects to be transferred, which was copied to the on-premise cloud system 3 of any of the sites 2 or the public cloud storage apparatus 14 of the public cloud system 4 based on the prefetch control processing described above, has been updated. The difference synchronization control program 24B reflects the updated content of the objects to be transferred, in which the copy object was updated, in the original objects to be transferred (objects to be transferred of the copy source) according to the processing routine shown in FIG. 7.

In effect, with the information processing system 1, when the copy object of the objects to be transferred is updated, a notice to such effect is notified from the object storage apparatus 10, the disk array device 11 or the public cloud storage apparatus 14 retaining that copy object to the optimal object placement device 6. In the following explanation, this notice is referred to as the copy object update notice.

When the difference synchronization control program 24B receives the copy object update notice, the difference synchronization control program 24B starts the difference synchronization control processing shown in FIG. 7, and foremost changes the value of the operation column 25F (FIG. 3) of the entry corresponding to the copy object in the access history table 25 (FIG. 3) to "update" (S30).

Subsequently, the difference synchronization control program 24B updates the value of the difference synchronization flag stored in the difference synchronization flag column 27H (FIG. 5) of the corresponding entry (referring to the entry in which the related number of an object pair, in which the objects to be transferred are the succeeding object, is stored in the transfer target related number column 27A; hereinafter the same) in the transfer method management table 27 (FIG. 5) to "Not synced" (S31).

Next, the difference synchronization control program 24B instructs the object storage apparatus 10, the disk array device 11 or the public cloud storage apparatus 14 retaining the copy object of the objects to be transferred to execute the difference synchronization of reflecting, in the original objects to be transferred, the difference (that is, the updated content of the copy object) between the copy object of the objects to be transferred and the original objects to be transferred based on the difference synchronization function equipped in the object storage apparatus 10, the disk array device 11 or the public cloud storage apparatus 14 (S32).

Note that, when the object storage apparatus 10, the disk array device 11 or the public cloud storage apparatus 14 retaining the copy object of the objects to be transferred is not equipped with the difference synchronization function, for example, it is also possible to use third-party software and execute the difference synchronization processing by comparing the hash values or the like of the copy source and the copy destination.

The difference synchronization control program 24B thereafter waits for the difference synchronization between the copy object of the objects to be transferred and the original objects to be transferred to be completed (S33). When the difference synchronization is eventually completed, the difference synchronization control program 24B updates the value of the difference synchronization flag stored in the difference synchronization flag column 27H of the corresponding entry in the transfer method management table 27 to "Synced" (S34), and thereafter ends the difference synchronization control processing.

Note that this difference synchronization control processing may be executed during the update of the copy object of the objects to be transferred, or executed collectively after the update of the copy object is completed.

(3-3) Transfer Tier Determination Processing

Figure 8:
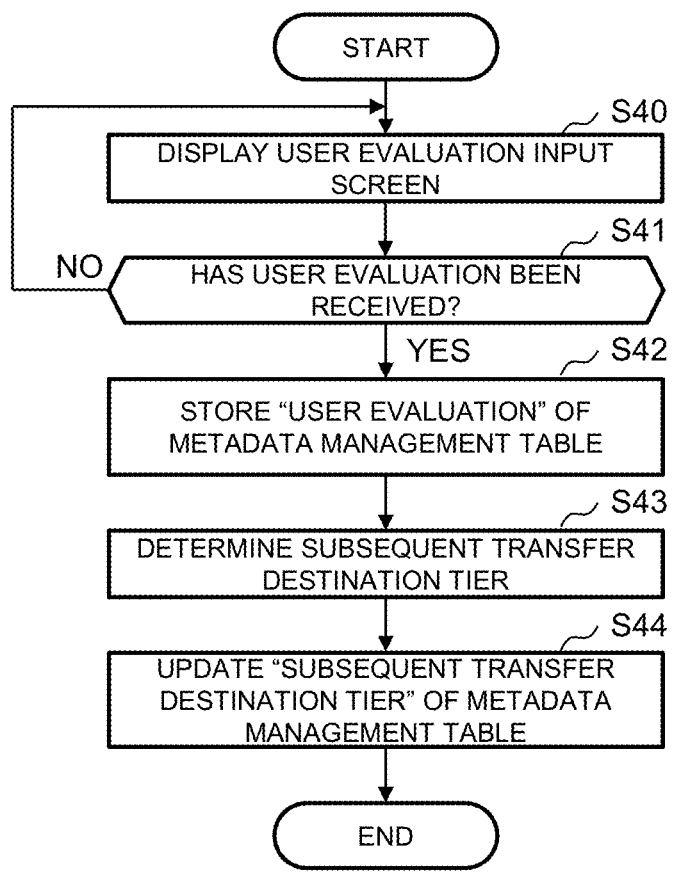
FIG. 8 is a flowchart showing the processing routine of the transfer tier determination processing.

Meanwhile, FIG. 8 is a diagram showing the flow of the computation processing to be executed by the transfer tier control program 24D, after the foregoing prefetch control processing is executed (for example, the following day), for determining the storage tier of the subsequent transfer destination of the objects to be transferred (this processing is hereinafter referred to as the "transfer tier determination processing"). The transfer tier control program 24D determines and sets the storage tier of the transfer destination (this is hereinafter referred to as the "subsequent transfer destination tier") to be used at the time of the subsequent prefetch control of the objects to be transferred, which were transferred based on the prefetch control processing, according to the processing routine shown in FIG. 8.

Figure 9A:
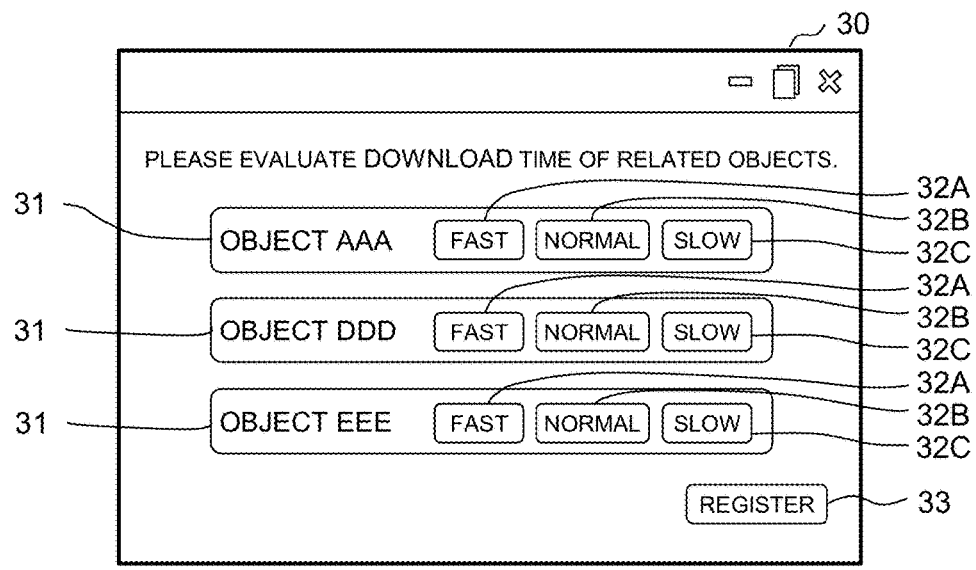
FIG. 9A is a diagram showing a configuration example of the user evaluation input screen.

In effect, when the client/host 5 (FIG. 1), which was used by the user and is to undergo prefetch control processing, is activated the following day, the object optimization program 24 displays a user evaluation input screen 30, such as the screen shown in FIG. 9A, on the client/host 5.

Displayed on the user evaluation input screen 30 are object evaluation columns 31 each corresponding to the objects to be transferred which were transferred based on the prefetch control processing. Displayed on each object evaluation column 31 are three buttons 32A, 32B and 32C which respectively correspond to "fast", "normal" and "slow" (S40).

Figure 9B:
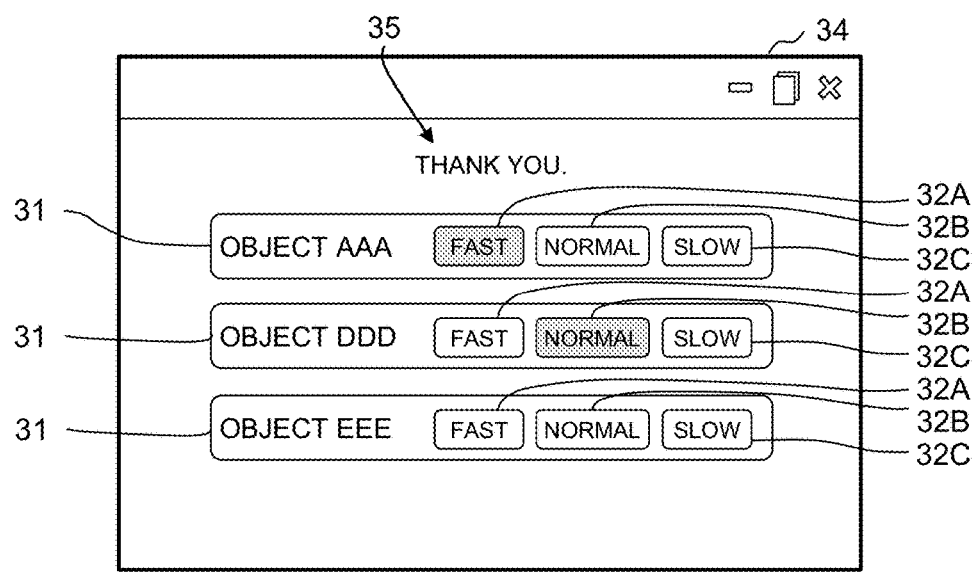
FIG. 9B is a diagram showing a configuration example of the registration result screen.

Consequently, the user evaluates the access speed regarding the speed of access to the respective objects to be transferred by clicking the button 32A corresponding to "fast" of the corresponding object evaluation column 31 when the user felt that the access speed was fast, clicking the button 32B corresponding to "normal" of the corresponding object evaluation column 31 when the user felt that the access speed was normal, and clicking the button 32C corresponding to "slow" of the corresponding object evaluation column 31 when the user felt that the access speed was slow. Moreover, the user clicks the registration button 33 after completing the evaluation of the access speed of all objects to be transferred. Consequently, as shown in FIG. 9B, displayed are a character string 35 of "Thank you.", and a registration completion screen 34 in which the buttons 32A to 32C clicked by the user are colored in each object evaluation column 31.

Subsequently, when the registration button 33 is clicked after the input of the user evaluation regarding the access speed to the respective objects to be transferred on the user evaluation input screen 30 is completed, the user evaluation that was input regarding the access speed to the respective objects to be transferred is sent from the client/host 5 to the optimal object placement device 6.

Meanwhile, after the processing of step S30, the transfer tier control program 24D waits for the user evaluation to be sent from the corresponding client/host 5 (S41).

Subsequently, when the user evaluation is eventually sent to the client/host 5, the transfer tier control program 24D stores the user evaluation ("fast", "normal" or "slow") in the user evaluation column 26BA of the entry corresponding to the objects to be transferred in the metadata management table 26 (FIG. 4) (entry in which the object name of the objects to be transferred is stored in the ordering column 26AD) based on the received user evaluation regarding each of the corresponding objects to be transferred (S42).

Subsequently, the transfer tier control program 24D determines each of the subsequent transfer destination tiers based on the current storage tier and user evaluation regarding each of the objects to be transferred (S43).

Specifically, the transfer tier control program 24D determines, as the subsequent transfer destination tier, the storage tier that is one tier lower (access speed which is slower by one tier) than the current storage tier regarding the object to be transferred in which the user evaluation was "fast". Accordingly, in the foregoing case, when the current storage tier is "Tier 1", "Tier 2" is determined as the subsequent transfer destination tier, and when the current storage tier is "Tier 2", "Tier 3" is determined as the subsequent transfer destination tier.

Moreover, the transfer tier control program 24D determines the current storage tier as the subsequent transfer destination tier regarding the object to be transferred in which the user evaluation was "normal". Furthermore, the transfer tier control program 24D determines, as the subsequent transfer destination tier, the storage tier that is one tier higher (access speed which is faster by one tier) than the current storage tier regarding the object to be transferred in which the user evaluation was "slow". Accordingly, in the foregoing case, when the current storage tier is "Tier 3", "Tier 2" is determined as the subsequent transfer destination tier, and when the current storage tier is "Tier 2", "Tier 1" is determined as the subsequent transfer destination tier.

Next, the transfer tier control program 24D stores, in the subsequent transfer destination tier column 26BB of the entry corresponding to the objects to be transferred in the metadata management table 26 (entry in which the object name of the objects to be transferred has been stored in the ordering column 26AD), the respective subsequent transfer destination tiers determined in step S33 regarding the objects to be transferred (S44). The transfer tier control program 24D thereafter ends the transfer tier determination processing.

Accordingly, when the transfer objects are to be transferred to any of the sites once again based on the prefetch control, the foregoing transfer tier control is performed so that the storage tier of the transfer destination of the objects to be transferred becomes the storage tier determined in step S43 (refer to explanation of step S28 of prefetch control processing).

(3-4) Copy Object Deletion Processing

Meanwhile, FIG. 10 is a diagram showing the flow of the copy object deletion processing to be periodically executed by the copy object deletion control program 24C. The copy object deletion control program 24C deletes, according to the processing routine shown in FIG. 10, the copy object of each of the objects to be transferred, in which the safekeeping period thereof has elapsed, remaining in any of the storage tiers of any of the sites 2 from that storage tier.

In effect, when the copy object deletion control program 24C starts the copy object deletion processing, the copy object deletion control program 24C foremost selects one entry, among the entries of the transfer method management table 27 (FIG. 5), in which a safekeeping period has been set and in which the processing of step S51 onward has not yet been performed (S50).

Subsequently, the copy object deletion control program 24C determines whether the date stored in the safekeeping period column 27E (FIG. 5) of the entry selected in step S50 (this is hereinafter referred to as the "selected entry") is a date that is earlier than today's date (whether the safekeeping period has already elapsed) (S51).

When the copy object deletion control program 24C obtains a negative result in the foregoing determination, the copy object deletion control program 24C proceeds to step S53. Meanwhile, when the copy object deletion control program 24C obtains a positive result in the determination of step S51, the copy object deletion control program 24C updates the temporary copy object deletion flag stored in the temporary copy object deletion flag column 27G (FIG. 5) of the selected entry from the initial value of "False" to "True" (S52).

Subsequently, the copy object deletion control program 24C determines whether the processing of step S52 and step S53 has been completed regarding all corresponding entries of the transfer method management table 27 (S53). When the copy object deletion control program 24C obtains a negative result in the foregoing determination, the copy object deletion control program 24C returns to step S50, and thereafter repeats the processing of step S50 to step S53 until a positive result is obtained in step S53.

Based on this repeated processing, among the entries of the transfer method management table 27, each of the temporary copy object deletion flags of the entry corresponding to each of the copy objects in which the safekeeping period has elapsed is updated to "True" among the objects to be transferred in which the copy object is remaining in the object storage apparatus 10, the disk array device 11 or the public cloud storage apparatus 14 which is providing the storage area of any of the sites 2.

When the copy object deletion control program 24C eventually obtains a positive result in step S53 as a result of all temporary copy object deletion flags of the corresponding entries corresponding to the respective objects to transferred, in which the safekeeping period of the copy object has elapsed as described above, having been updated to "True", the copy object deletion control program 24C instructs the object storage apparatus 10, the disk array device 11 or the public cloud storage apparatus 14 retaining the copy object to delete the third copy object for each of the objects to be transferred (S54).

Consequently, the object storage apparatus 10, the disk array device 11 or the public cloud storage apparatus 14 that received the foregoing instruction deletes the designated copy object from its own storage. The copy object deletion control program 24C thereafter ends the copy object deletion processing.

(4) Effect of this Embodiment

As described above, in the information processing system 1 of this embodiment, when two objects configuring an object pair are accessed consecutively from a site 2 that is different from the site 2 storing those objects, all objects that are likely to be accessed consecutively after the object pair are transferred in advance to the site 2 from which the object pair was accessed.

Thus, accordingly to the information processing system 1, when it is likely that a user is to use a plurality of objects in order, it is possible to improve the accessibility to the respective objects to be used consecutively from the third object onward, and thereby inhibit the deterioration of the operational efficiency caused by the degradation in the access speed to the objects.

(5) Other Embodiments

Note that, while the foregoing embodiment explained a case of causing the third object onward which are likely to be accessed consecutively to undergo the prefetch control, the present invention is not limited thereto, and the second object onward which are likely to be accessed consecutively may be caused to undergo the prefetch control. In the foregoing case, in step S12 of FIG. 6B, the related number stored in the related number column 26AE of the entries, among the entries of the metadata management table 26, in which the object name of the target succeeding object is stored in the ordering column 26AD is stored in the transfer target related number column 27A of a different unused line of the transfer method management table 27 (FIG. 5).

Nevertheless, as a result of causing the third object onward which are likely to be accessed consecutively to undergo the prefetch control as in this embodiment, for example, since it is possible to avoid a situation where all objects that are likely to be consecutively accessed thereafter from being transferred as a result of the first object merely being accessed, the generation of the network load or the load of the storage apparatus of the transfer source and the transfer destination caused as a result thereof can be prevented.

Moreover, while the foregoing embodiment explained a case of causing the third object onward which are likely to be accessed consecutively to undergo the prefetch control, the present invention is not limited thereto, and it is also possible to transfer, at the stage that a certain object is accessed, only the object that is likely to be accessed consecutively after that object.

Furthermore, while the foregoing embodiment explained a case where each of the sites 2 has a plurality of storage tiers, the present invention is not limited thereto, and the present invention can also be applied in cases where only certain sites 2 have a plurality of storage tiers.

INDUSTRIAL APPLICABILITY

The present invention can be broadly applied to various types of information processing systems having a storage area in each of a plurality of sites and in which a user can access objects stored in the storage area of all of the sites from each of the sites.

REFERENCE SIGNS LIST

1 . . . information processing system, 2 . . . site, 3, 3A to 3B . . . on-premise cloud system, 4 . . . public cloud system, 5 . . . client/host, 6 . . . optimal object placement device, 10 . . . object storage apparatus, 11 . . . disk array device, 14 . . . storage apparatus, 20 . . . CPU, 24A . . . prefetch control program, 24B . . . difference synchronization control program, 24C . . . copy object deletion control program, 24D . . . transfer tier control program, 25 . . . access history table, 26 . . . metadata management table, 27 . . . transfer method management table, 30 . . . user evaluation input screen, 34 . . . registration completion screen.

The invention claimed is:

1. An optimal object placement device which optimizes, in an information processing system having a storage area in each of a plurality of sites and in which a user can access objects stored in the storage area of all of the sites from each of the sites, placement of each of the objects, comprising:
   an access tendency detection unit which detects an access tendency as a tendency of continuity of the user's access to the objects, which include a first object and a second object, and determines whether access by the user of the first object and the second object occurs consecutively a number of times equal to or greater than a prescribed threshold; and
   an object transfer control unit which executes, upon determining the access by the user of the first object and the second object occurs consecutively a number of times equal to or greater than the prescribed threshold, when the user accesses a first object from a second site which is different from a first site having the storage area storing the first object, control for transferring in advance, to the storage area of the second site from which the first object was accessed, the second object,
   wherein the object transfer control unit:
   executes control for copying in advance the second object to the storage area of the second site when the second site is a relatively rare site as the site used by the user for accessing the first object; and
   executes control for migrating in advance the second object to the storage area of the second site when the second site is not a relatively rare site as the site used by the user for accessing the first object.

2. The optimal object placement device according to claim 1, further comprising:
   a difference synchronization control unit which executes, when the second object copied to the second site is updated, control for reflecting the update in the second object of a copy source stored in the storage area of the first site.

3. The optimal object placement device according to claim 2, further comprising:
   a copy object deletion control unit which executes, when the second object copied to the storage area of the second site is not accessed for a given period of time, control for deleting the copied second object from the storage area of the second site.

4. The optimal object placement device according to claim 1,
   wherein a part or all of the sites include the storage area of a plurality of storage tiers each having a difference access speed to the respectively stored objects, and
   wherein the optimal object placement device further comprises:
   a transfer tier control unit which determines, based on an evaluation of the user regarding an access speed to the second object after transferring the second object to the storage area of the second site, the storage tier of a transfer destination upon subsequently transferring the second object.

5. An optimal object placement method to be executed by an optimal object placement device which optimizes, in an information processing system having a storage area in each of a plurality of sites and in which a user can access objects stored in the storage area of all of the sites from each of the sites, placement of each of the objects, comprising:
   a first step of detecting an access tendency as a tendency of continuity of the user's access to the objects, which include a first object and a second object, and determining whether access by the user of the first object and the second object occurs consecutively a number of times equal to or greater than a prescribed threshold; and
   a second step of executing, upon determining the access by the user of the first object and the second object occurs consecutively a number of times equal to or greater than the prescribed threshold, when the user accesses a first object from a second site which is different from a first site having the storage area storing the first object, control for transferring in advance, to the storage area of the second site from which the first object was accessed, the second object,
   wherein, in the second step:
   control is executed for copying in advance the second object to the storage area of the second site when the second site is a relatively rare site as the site used by the user for accessing the first object; and
   control is executed for migrating in advance the second object to the storage area of the second site when the second site is not a relatively rare site as the site used by the user for accessing the first object.

6. The optimal object placement method according to claim 5, further comprising:
   a third step of executing, when the second object copied to the second site is updated, control for reflecting the update in the second object of a copy source stored in the storage area of the first site.

7. The optimal object placement method according to claim 6, further comprising:
   a fourth step of executing, when the second object copied to the storage area of the second site is not accessed for a given period of time, control for deleting the copied second object from the storage area of the second site.

8. The optimal object placement method according to claim 5,
wherein a part or all of the sites include the storage area of a plurality of storage tiers each having a difference access speed to the respectively stored objects, and
wherein the optimal object placement method further comprises:
a transfer tier control step of determining, based on an evaluation of the user regarding an access speed to the second object after transferring the second object to the storage area of the second site, the storage tier of a transfer destination upon subsequently transferring the second object.

* * * * *